(12) United States Patent
Nagai

(10) Patent No.: US 7,364,367 B2
(45) Date of Patent: Apr. 29, 2008

(54) OPTICAL MODULE MANUFACTURING METHOD AND OPTICAL MODULE

(75) Inventor: Shuichi Nagai, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/019,950

(22) Filed: Dec. 23, 2004

(65) Prior Publication Data

US 2005/0141822 A1 Jun. 30, 2005

(30) Foreign Application Priority Data

Dec. 25, 2003 (JP) ............................. 2003-431057

(51) Int. Cl.
*G02B 6/36* (2006.01)

(52) U.S. Cl. ........................................ 385/88

(58) Field of Classification Search .................. 385/88
See application file for complete search history.

(56) References Cited

U.S. PATENT DOCUMENTS

| | | | | |
|---|---|---|---|---|
| 5,621,837 A | * | 4/1997 | Yamada et al. ................ | 385/88 |
| 5,861,637 A | * | 1/1999 | Oishi ............................ | 257/98 |
| 6,141,471 A | * | 10/2000 | Agatsuma ..................... | 385/49 |
| 6,328,485 B1 | * | 12/2001 | Hotta ............................ | 385/94 |
| 6,453,096 B1 | * | 9/2002 | Kim et al. ..................... | 385/52 |
| 6,616,346 B1 | * | 9/2003 | Brown et al. ................. | 385/90 |
| 2002/0131731 A1 | * | 9/2002 | Ikeda et al. ................... | 385/92 |
| 2003/0035634 A1 | * | 2/2003 | Shimada et al. .............. | 385/88 |
| 2003/0053764 A1 | * | 3/2003 | Ebeling et al. ............... | 385/88 |
| 2004/0114883 A1 | * | 6/2004 | Furuichi et al. .............. | 385/93 |
| 2004/0156597 A1 | * | 8/2004 | Kaneko ........................ | 385/88 |
| 2004/0240773 A1 | * | 12/2004 | Kobinata et al. ............. | 385/14 |

FOREIGN PATENT DOCUMENTS

JP 09-197196 * 7/1997

* cited by examiner

*Primary Examiner*—Michelle Connelly-Cushwa
*Assistant Examiner*—Chris Chu
(74) *Attorney, Agent, or Firm*—McDermott Will & Emery LLP

(57) ABSTRACT

A method for manufacturing optical modules having excellent high-frequency properties that can be mass produced at low cost. Such a manufacturing method includes the following steps. First off, an optical device and an optical fiber are placed mechanically on an optical-alignment jig for optically coupling the optical device and optical fiber. Secondly, the optical device and optical fiber placed on the jig are bonded together to form a bonded part using a bonding material. Finally, the bonded part is removed from the jig and mounted to an optical module substrate.

14 Claims, 12 Drawing Sheets

OPTICAL MODULE MANUFACTURING METHOD AND OPTICAL MODULE

BACKGROUND OF THE INVENTION (1) Field of the Invention

The present invention relates to a technique for manufacturing optical modules provided with an optical device (such as a semiconductor laser and a photodiode) that are used in optical fiber communications, at low cost.

(2) Description of the Related Art

In manufacturing optical modules, one of active alignment and passive alignment is employed as a method in order to optically couple one end of an optical fiber and an optical device.

With the active alignment method, an optical fiber is coupled with an optical device at a position where the highest optical coupling efficiency is obtained. This position is determined in the following manner; one end of the optical fiber is moved three dimensionally for fine adjustment while light emitted from a light emitting unit enters the end of the optical fiber, and an output intensity of light that comes out from the other end is measured.

Aligning optical axes of the optical fiber and optical device using the active alignment method is suitable to manufacture optical modules used in long-distance and high-power transmission, because such optical modules have high optical coupling efficiency. However, there are problems with the active alignment method in terms of cost and mass productivity, because apparatuses for light-axis adjustment are expensive, and adjusting the light axis using the active alignment method takes time.

On the other hand, with the passive alignment method, the optical axes of the optical fiber and optical device are optically aligned, simply by disposing the optical fiber and optical device on a semiconductor substrate having a V-shaped groove.

Although not very high, the optical coupling efficiency between the optical fiber and optical device coupled using the passive alignment method is sufficient in cases in which a transmission distance is shorter than 20 km. Moreover, as an advantage in comparison with the active alignment method, the passive alignment method enables mass production of the optical modules at low cost.

FIG. 12 is a perspective view illustrating an example of a passive alignment optical module.

An optical module 100 includes a semiconductor laser 20, an optical fiber 30, a semiconductor substrate 101, a resin 103, and a wire 106.

The semiconductor substrate 101 includes a V-shaped groove 102, alignment markers 104, and electrodes 107 and 108.

The V-shaped groove 102 is formed using a mask alignment apparatus (not depicted) and an etching apparatus (not depicted). A width of the V-shaped groove 102 is determined by the mask alignment apparatus, and then the etching apparatus etches the V-shaped groove 102.

In the nature of crystalline structure of the semiconductor substrate 101, an angle of the etched groove is automatically determined according to the width of the groove. Therefore, it is possible to adjust the depth of the V-shaped groove 102 by depending on the width of the groove.

The alignment markers 104 allow a die-bonding apparatus (not shown in the drawing) to recognize an image of the position to place the semiconductor laser 20.

The semiconductor laser 20 is disposed junction-down on the electrode 108 of the semiconductor substrate 101 by the die-bonding apparatus.

"Junction-down" is a state in which a semiconductor laser (layered structure) is positioned with a main surface closer to a light-emitting layer (active layer) facing toward the semiconductor substrate. The main surface of the semiconductor laser closer to the light-emitting layer is hereinafter referred to as the front surface, and the other main surface is referred to as the back surface. Mounting the semiconductor laser with the front surface joined to the semiconductor substrate is called "junction-down mounting". In contrast, "junction-up" is a state in which the front surface of the semiconductor laser faces away from the semiconductor substrate, and mounting the semiconductor laser with the back surface joined to the semiconductor substrate is called "junction-up mounting".

The back surface of the semiconductor laser is usually polished. Due to the polishing, a distance from the back surface to the light-emitting layer varies for individual semiconductor devices.

This means the junction-up mounting requires an adjustment of the light-axes. Therefore, normally junction-down mounting is employed in the passive alignment method.

In general, a power electrode that receives driving current is formed on the front surface, and a ground electrode is formed on the back surface of the semiconductor laser 20.

A soldering paste is applied to the electrode 108 before the semiconductor laser 20 is disposed. In a reflow step after the disposition of the semiconductor laser 20, the power electrode of the semiconductor laser 20 and the electrode 108 are soldered.

Further, the ground electrode of the semiconductor laser 20 and the electrode 107 are wire-bonded.

The optical fiber 30 is disposed in the V-shaped groove 102, and then bonded to the semiconductor substrate 101 by the resin 103.

Moreover, in order to obtain as high an optical coupling efficiency as that obtained by the active alignment method using a simple structure, Japanese Laid-Open Patent Application No. H10-311936 discloses an optical module characterized in that an optical fiber and an optical device are optically coupled after being disposed in a guiding groove or a square groove that are formed with a high degree of accuracy.

For both of the above-described optical module 100 and the optical module disclosed in the patent document, semiconductor substrates made of Si and having excellent flatness and high precision workability are utilized.

While the optical module 100 manufactured by the passive alignment method as described above and the optical module disclosed in the patent document can be mass produced at low cost in comparison with the active alignment optical modules, the optical module 100 and the optical module disclosed in the patent document have a disadvantage of poor high-frequency properties.

The poor high-frequency properties can cause the following problem. In an optical module provided with a semiconductor laser, a high-frequency current is fed through a wiring pattern to drive the semiconductor laser at high speed. Moreover, the semiconductor laser cannot be driven if the high-frequency current flows to a parasitic capacitance formed between electrode patterns that sandwich an insulation layer on the semiconductor substrate.

Another problem is that the production cost of the semiconductor substrate (including costs for material, forming the V-shaped groove, flattening, and processing) is relatively expensive compared to substrates made of other material such as ceramic and metal.

SUMMARY OF THE INVENTION

The present invention is made in order to solve the above noted problems, and aims to provide an optical module which can be manufactured at low cost without requiring a semiconductor substrate as an essential component, and has excellent high-frequency properties in comparison with conventional passive alignment optical modules, as well as a method of manufacturing the same.

The above object of the present invention can be achieved by an optical module manufacturing method, including a first step of placing an optical device and an optical fiber at a predetermined position on an optical-alignment jig for optically coupling the optical device and optical fiber, a second step of bonding together the optical device and optical fiber placed on the jig using a bonding material, to form a bonded part, and a third step of removing the bonded part from the jig, and mounting the bonded part to an optical module substrate.

According to the above described optical module manufacturing method is employed, the optical module substrate does not have to be made of semiconductor. Thus, it is possible to manufacture the optical module that is low in cost and excellent in high-frequency properties in comparison with the conventional passive alignment optical modules that use a semiconductor substrate.

Examples of such an optical module substrate include a ceramic substrate and a metal substrate that are excellent in high-frequency properties. By using the metal substrate, especially, it is possible to realize low cost optical modules with long term stability and reliability capable of dispersing heat generated by the semiconductor laser.

The above optical module manufacturing method may be such that the optical device is a semiconductor laser, the semiconductor laser is placed junction-down on the jig in the first step, and the semiconductor laser bonded to the optical fiber is mounted junction-up to the substrate in the third step.

By this, the semiconductor laser may be mounted junction-up to the optical module substrate.

With junction-down mounting that is employed in the conventional passive alignment method, a ground electrode formed on a back surface of the semiconductor laser is connected to a ground electrode of the optical module substrate by wire-bonding, and it is not possible to obtain very good high-frequency properties using junction-down mounting. By employing junction-up mounting, however, the ground electrode of the semiconductor laser is soldered to the ground electrode of the optical module substrate, and thus it is possible to obtain better high-frequency properties than wire-bonding the ground electrodes in which only a small area is connected to each other.

The above optical module manufacturing method may be such that the second step includes a substep of reinforcing a bonding strength between the optical device and optical fiber using a reinforcing member.

By this, the bonding between the optical device and optical fiber is strengthened. Thus, it is possible to reduce occurrence of misalignment in optical coupling when mounting the bonded part, and the production of the optical modules with long term reliability is realized.

The above optical module manufacturing method may be such that the optical device includes one of a light emitting region and a light receiving region, the bonding material includes an index matching resin and an ultraviolet curing resin, and in the second step, the bonding material is filled between the optical device and optical fiber so as to cover an end surface of the optical fiber and the one of the light emitting region and light receiving region, and cured by ultraviolet irradiation.

By this, it is possible to prevent reflection of light due to a difference in indexes that is caused when an air is included between light guides of the optical device and optical fiber. Further, the above method is suitable for mass production because the optical device and optical fiber together may be bonded together by curing the bonding material with the ultraviolet irradiation.

The above optical module manufacturing method may be such that the second step includes a substep of protecting, using a protecting member, a mounting surface of the optical device to be mounted to the substrate, or that the protecting member is made from a resin of a different material to the bonding material, and the second step further includes a substep of detaching the protecting member after the bonding material has been cured by the ultraviolet irradiation.

By this, the bonding material is prevented from being accidentally applied to the mounting surface of the optical device. Thus, it is possible to eliminate negative factors in mounting the bonded part to the substrate in the third step.

The above optical module manufacturing method may be such that the jig has a suction hole, and in the first step, one of the optical device and optical fiber is temporarily held in place on the jig by suction via the suction hole.

By this, the components can be aligned at high accuracy, suppressing misalignment of the components that tends to occur while the bonding material is applied. Thus, it is possible to obtain high optical coupling efficiency.

The above optical module manufacturing method may be such that the jig is made of a material that transmits ultraviolet light.

By this, it is possible to irradiate the ultraviolet light from behind the optical-alignment jig, and thus the ultraviolet curing resin can be cured evenly.

The above object of the present invention can be further achieved by an optical module including a bonded part including an optical device and an optical fiber that are optically coupled and bonded together using a bonding material, and an optical module substrate to which the bonded part is mounted.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes a preferred embodiment of the present invention with reference to the drawings.

Figure 1:
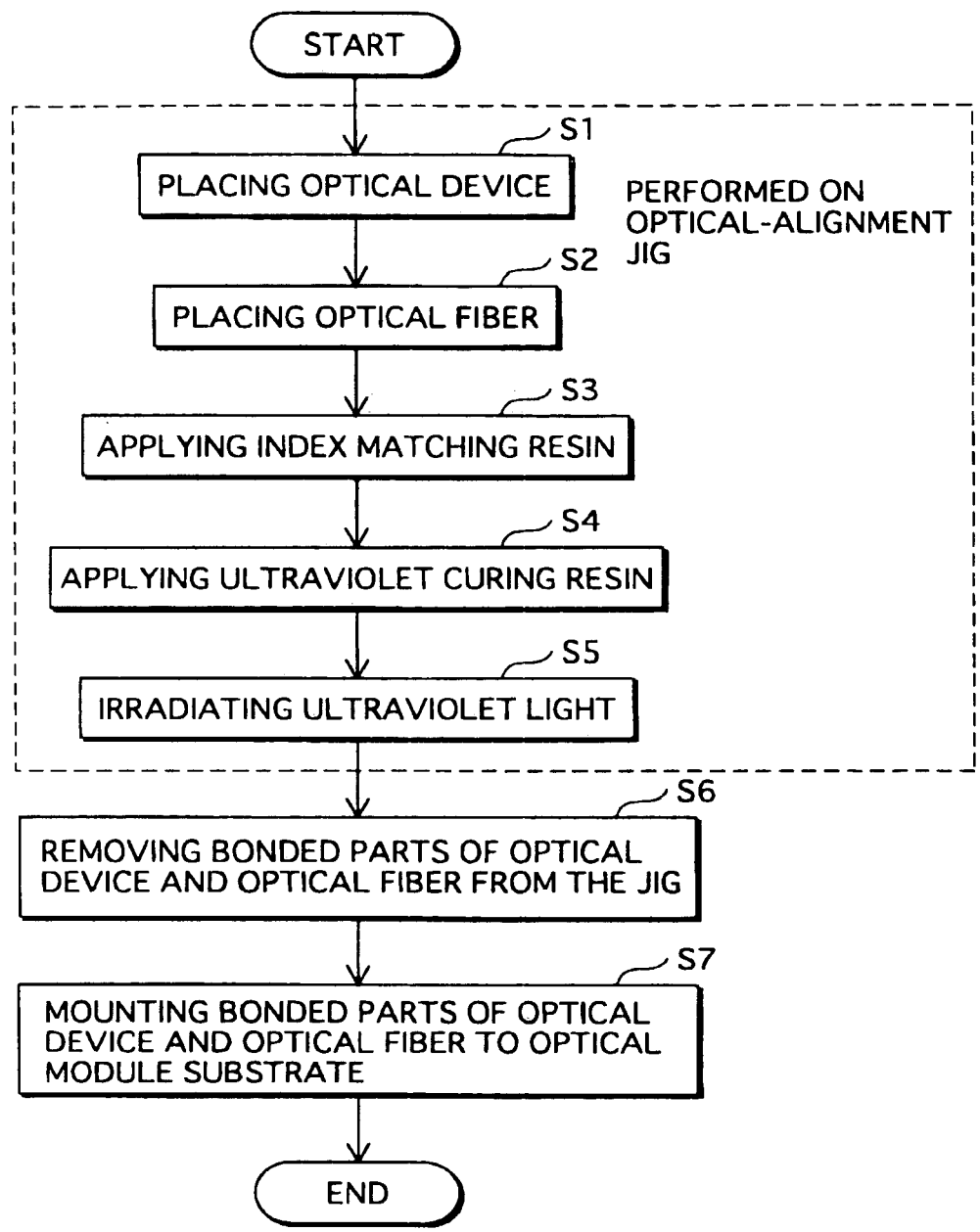
FIG. 1 is a flowchart showing steps of manufacturing an optical module.

FIG. 1 is a flowchart showing steps of manufacturing an optical module equipped with a semiconductor laser. FIGS. 2-7 are drawings to explain the manufacturing steps shown in FIG. 1.

Figure 7:
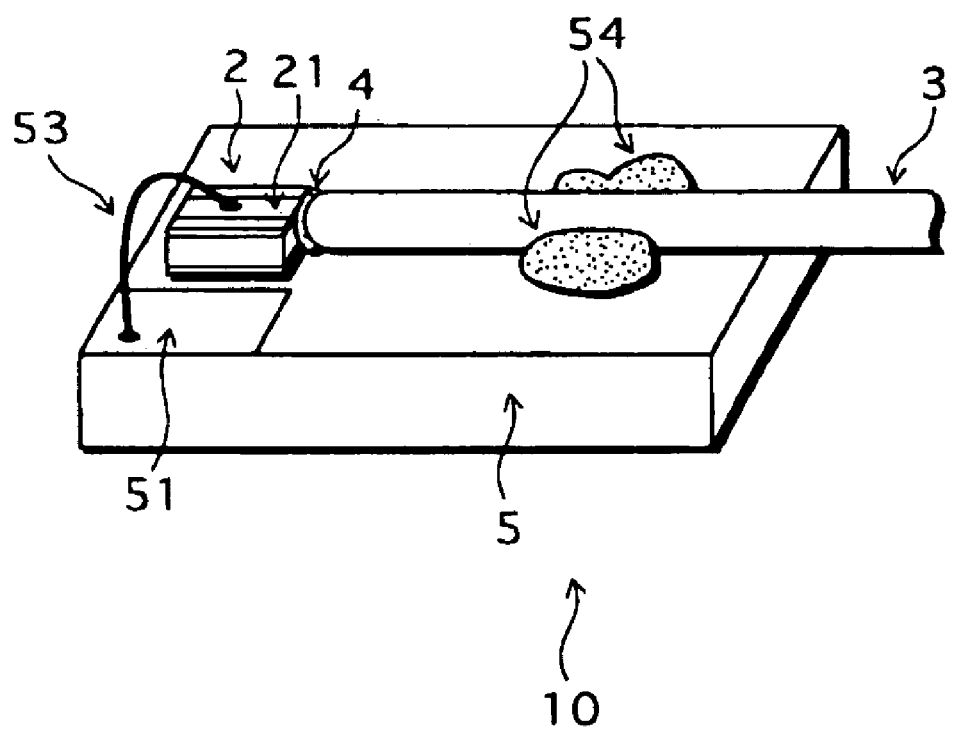
FIG. 7 illustrates steps S7 in FIG. 1.

An optical module 10 shown in FIG. 7 is a final product manufactured using an optical module manufacturing method according to the present invention.

Figure 2:
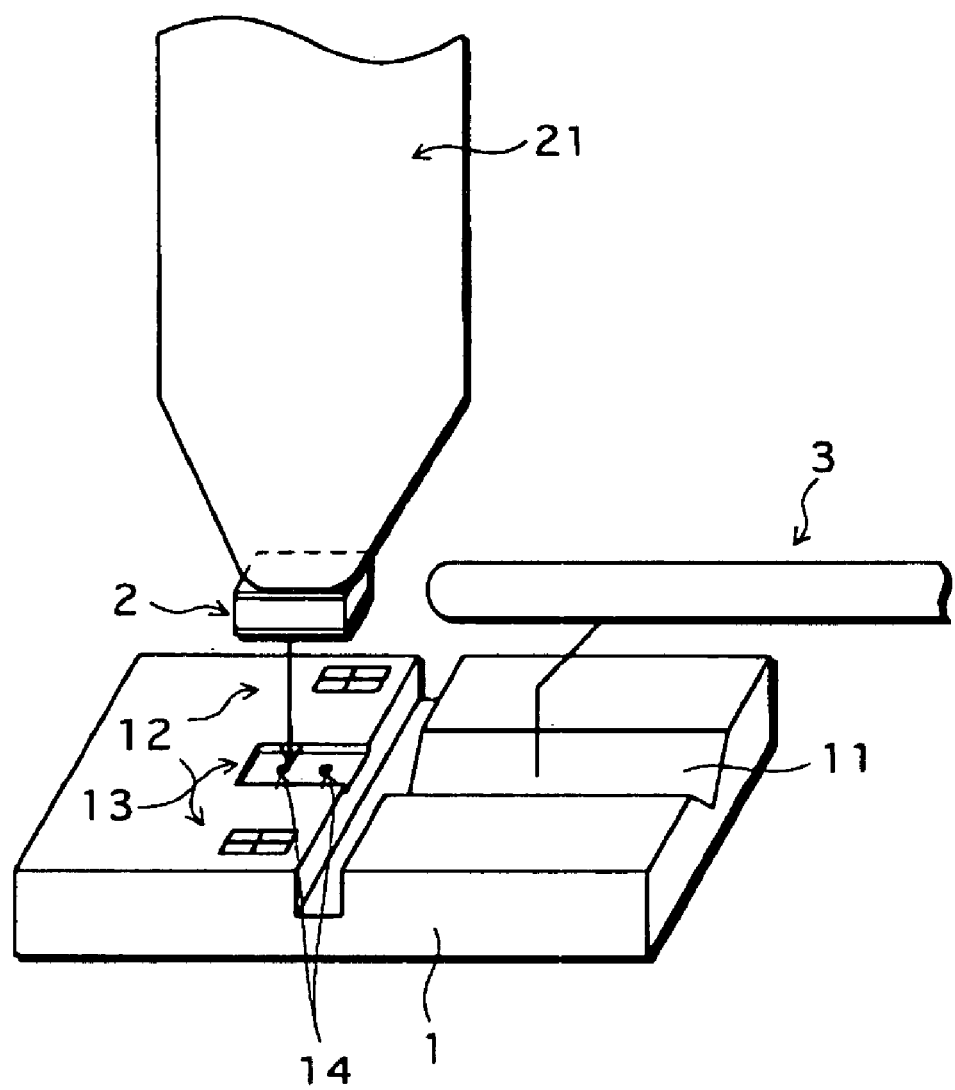
FIG. 2 illustrates steps S1 and S2 in FIG. 1.
Figure 3:
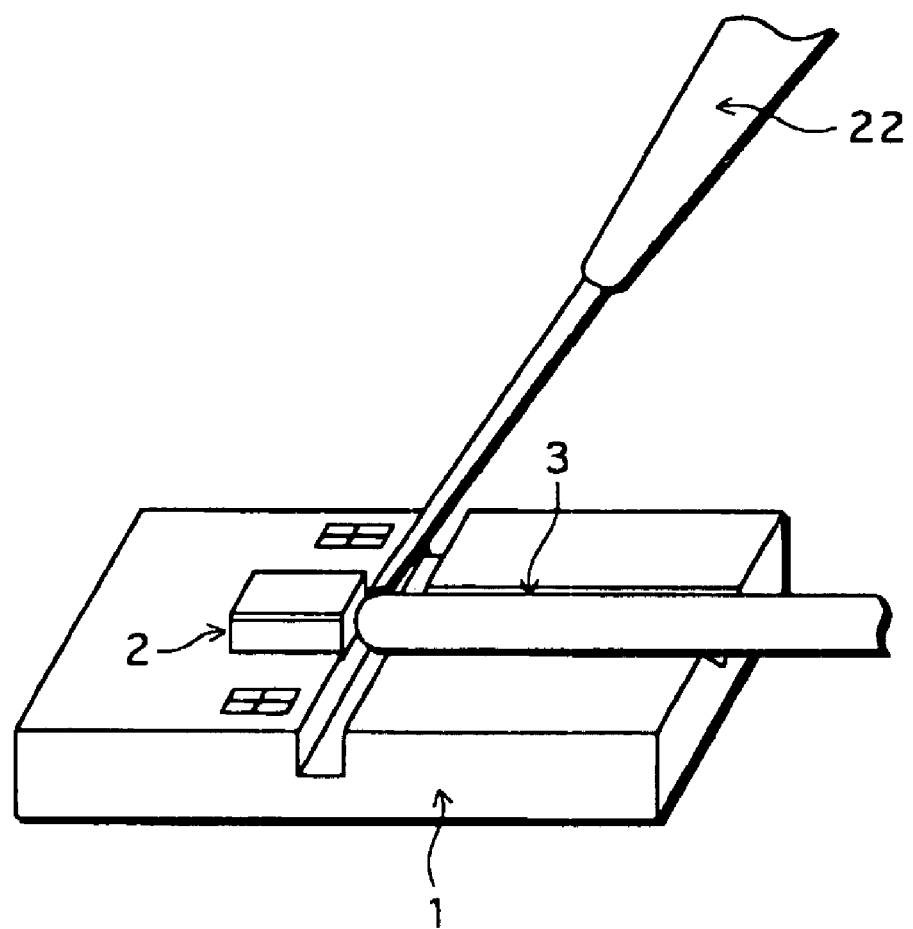
FIG. 3 illustrates steps S3 and S4 in FIG. 1.
Figure 4:
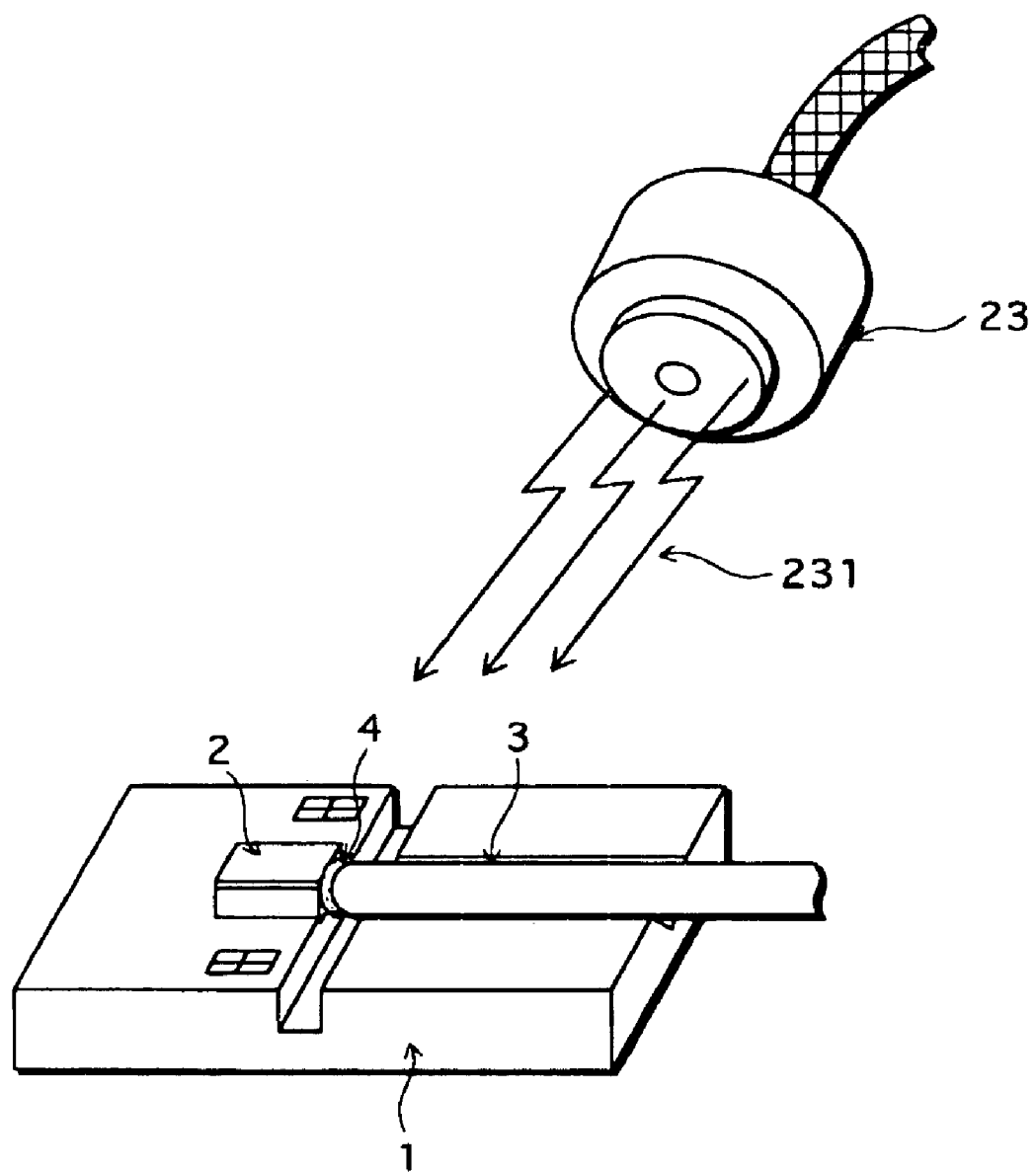
FIG. 4 illustrates steps S5 in FIG. 1.

As shown in FIGS. 2-5, apparatuses necessary to manufacture the optical module 10 include an optical alignment jig 1, a die-bonding apparatus (a collet 21 of the die-bonding apparatus is shown in FIGS. 2 and 3, though an entire view of the apparatus is not shown), an optical fiber holding apparatus (not shown in the drawing), a resin injecting apparatus (an injection unit 22 of the resin injecting apparatus is shown in FIG. 3, though an entire view of the apparatus is not shown), an ultraviolet irradiating apparatus (an ultraviolet lamp 23 of the ultraviolet irradiating apparatus is shown in FIG. 4, though an entire view of the apparatus is not shown), and a wire-bonding apparatus (not shown in the drawing).

The optical alignment jig 1 is made of semiconductor such as Si. The optical alignment jig 1 has a V-shaped groove 11, alignment markers 12, and a depression 13 on a first main surface of the optical alignment jig 1. Further, the optical alignment jig 1 has two suction holes 14 that penetrate the optical alignment jig 1 from the first main surface to a second main surface.

The V-shaped groove 11 is for placing an optical fiber 3, and the depression 13 is for placing a semiconductor laser 2.

Positions of the V-shaped groove 11 and depression 13 on the jig are determined so that a desired optical coupling efficiency is obtained automatically by placing the optical fiber 3 and semiconductor laser 2 on the V-shaped groove 11 and depression 13, respectively.

Further, the first main surface of the optical alignment jig 1 is fluoride-coated in order to prevent a bonding material, such as a resin for bonding the semiconductor laser 2 and optical fiber 3 together, from attaching to the optical alignment jig 1. 5 The following explains each manufacturing step shown in the flowchart of FIG. 1 with reference to FIGS. 2-7.

First, as shown in FIG. 2, the die-bonding apparatus determines the position to place the semiconductor laser 2 by recognizing images of the alignment markers 12 on the optical alignment jig 1, and then places the semiconductor laser 2 in the depression 13 on the optical alignment jig 1 by the collet 21 suctioning the semiconductor laser 2 (Step S1).

The semiconductor laser 2 is temporarily held in place on the optical alignment jig 1 by air suction via the suction holes 14.

Next, the optical fiber holding apparatus places the optical fiber 3 in the V-shaped groove 11 (Step S2).

In the next step, as shown in FIG. 3, the injection unit 22 of the resin injecting apparatus is moved near a space between a surface the optical device (near a light emitting point) and an end surface of the optical fiber. Then, an index matching resin is applied to the side surface of the optical device and the end surface of the optical fiber that are facing each other (Step S3).

As the index matching resin, OF101 produced by Shin-Etsu Chemical Co., Ltd. may be used, for example.

By filling the index matching resin between two light guides that are optically aligned, it is possible to prevent an air and/or an ultraviolet curing resin that is to be filled in the next step from being included between the optically coupled light guides.

After the application of the index matching resin, the resin injecting apparatus applies the ultraviolet curing resin 4 to surfaces of the index matching resin (Step S4).

As the ultraviolet curing resin, WORLD ROCK No. 8774 produced by Kyoritsu Chemical & Co., Ltd. may be used, for example.

After the ultraviolet curing resin is applied, ultraviolet light 231 is irradiated to the applied ultraviolet curing resin as shown in FIG. 4 (Step S5).

The ultraviolet curing resin 4 is cured by the irradiation of the ultraviolet light 231 from the ultraviolet lamp 23, so as to bond together the semiconductor laser 2 and optical fiber 3 to form a bonded part.

Figure 5:
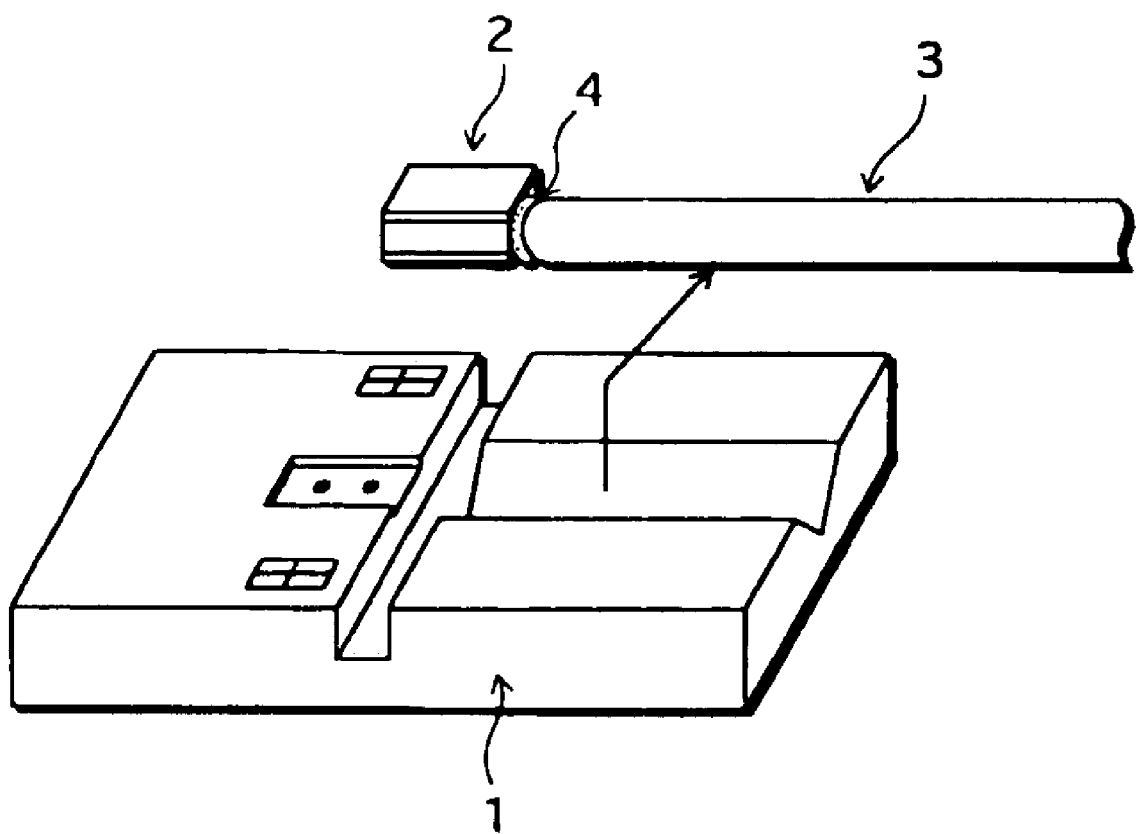
FIG. 5 illustrates steps S6 in FIG. 1.

After the ultraviolet irradiation, the optical fiber holding apparatus removes the bonded part of the semiconductor laser 2 and optical fiber 3 from the optical alignment jig 1 as shown in FIG. 5 (Step S6).

Figure 6:
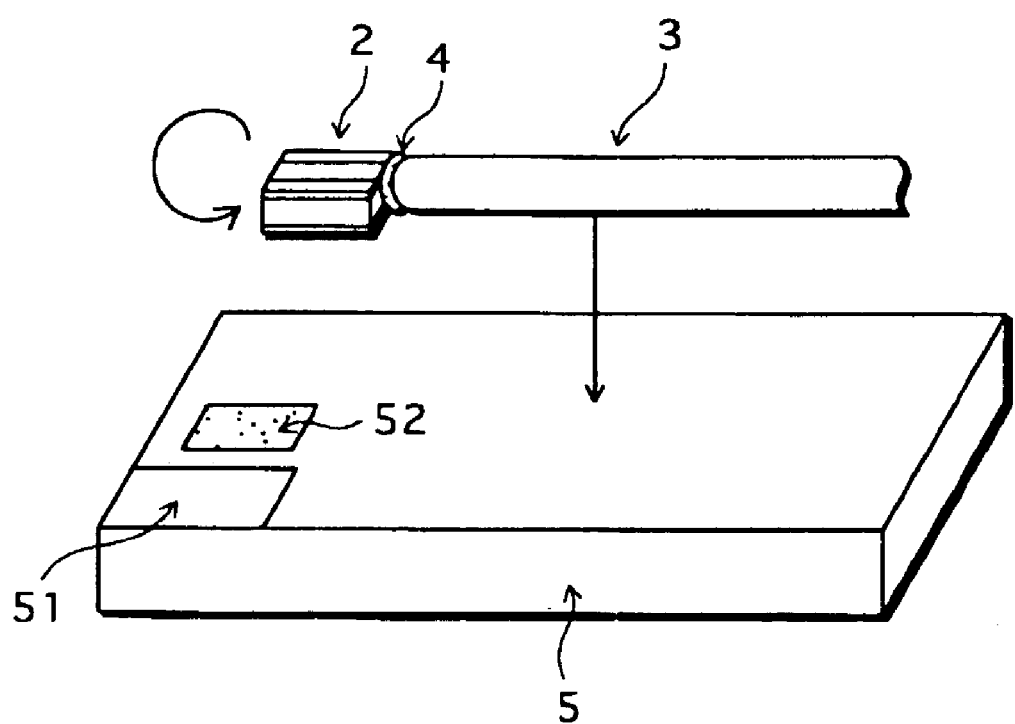
FIG. 6 illustrates steps S7 in FIG. 1.

The bonded part removed from the optical alignment jig 1 by the optical fiber holding apparatus is, as shown in FIG. 6, rotated upon the optical fiber 3 by 180 degrees, i.e. vertically turned around. Then the turned around bonded part is disposed on an optical module substrate 5, on an electrode 52 to which a soldering paste is applied. In other words, the semiconductor laser 2 is mounted junction-up.

The optical module substrate 5 is a substrate made of ceramic, and includes an electrode 51 and the electrode 52.

In a reflow step after mounting the bonded part of the semiconductor laser 2 and optical fiber 3, a back electrode of the semiconductor laser 2 and the electrode 52 are soldered. Then, as shown in FIG. 7, an electrode 24 of the semiconductor laser 2 and the electrode 51 of the optical module substrate 5 are wire-bonded. Further, a resin 54 is applied to the optical fiber 3 so as to bond the optical fiber 3 to the optical module substrate 5 (Step S7).

The optical module 10 is thus completed through the above manufacturing steps.

By using the above explained optical module manufacturing method, it is possible to manufacture optical modules using substrates (such as ceramic substrates) that are less expensive and have better high-frequency properties, instead of using semiconductor substrates.

Moreover, by the above manufacturing method, it is possible for optical modules to be equipped with a junction-up semiconductor lasers that can be driven at a higher speed with less parasitic capacitance in comparison with junction-down mounting.

MODIFIED EXAMPLES

The following describes modified examples of the above-explained optical module manufacturing method.

Modified Examples 1

A step of reinforcing a bonding strength between the semiconductor laser and optical fiber may be further performed in the above optical module manufacturing method.

Figure 8:
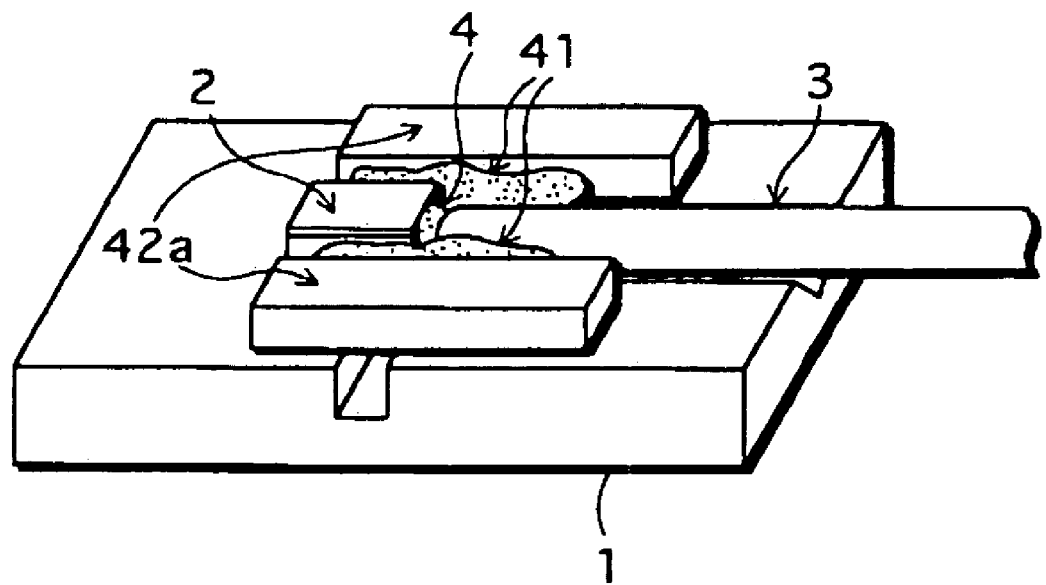
FIG. 8 illustrates a substep of reinforcing inserted between the steps S2 and S3 in FIG. 1.

FIG. 8 illustrates a reinforcing step inserted between the steps S2 and S3 in FIG. 1.

In order to reinforce the bonding strength between the semiconductor laser 2 and optical fiber 3 shown in FIG. 8, two reinforcing members 42*a* disposed in parallel along a lengthwise direction of the optical fiber 3 are attached to the semiconductor laser 2 and optical fiber 3 using a resin 41.

The reinforcing members 42*a* not only reinforce the bonding strength between the semiconductor laser 2 and optical fiber 3, but also have an effect of absorbing heat emitted from the semiconductor laser 2 while driving, and releasing the absorbed heat in lateral directions via the resin 41.

Examples of a material of the reinforcing members 42*b* include metal, resin, semiconductor, and glass. A shape of a reinforcing member is not restricted to the example shown in FIG. 8, and may take various different forms. One example is a U-shaped member like a reinforcing member 42*b* shown in FIG. 9.

Modified Examples 2

A step of protecting a mounting surface of the semiconductor laser using a protecting member may be further performed, before the step of filling the ultraviolet curing resin, in the above-described optical module manufacturing method.

Figure 10:
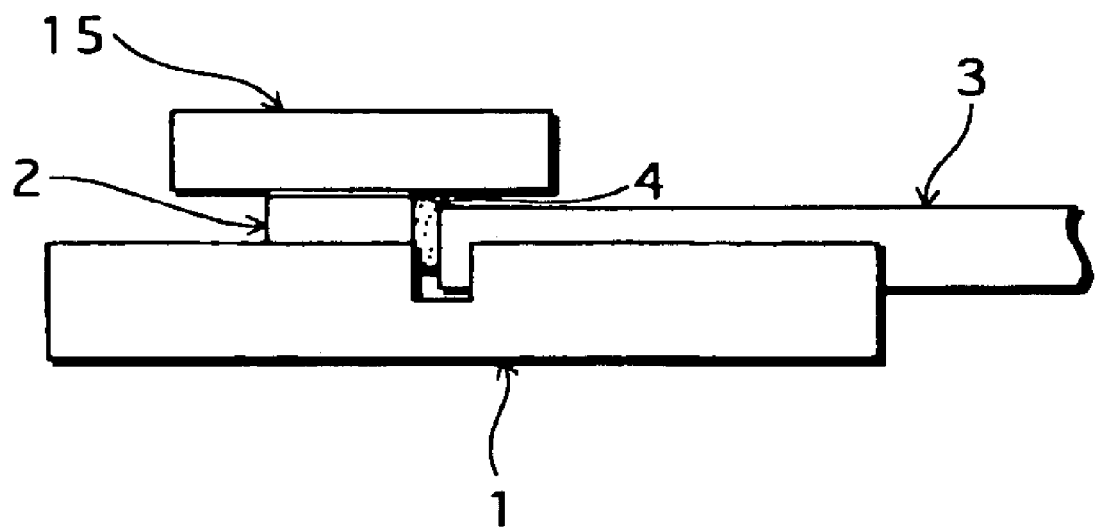
FIG. 10 illustrates a substep of protecting inserted between the steps S2 and S3 in FIG. 1.

FIG. 10 illustrates a protecting step inserted between the steps S2 and S3 in FIG. 1.

As shown in the drawing, a resin-protection substrate 15 is disposed on the mounting surface of the semiconductor laser 2. A surface of the resin-protection substrate 15 is fluoride-coated so that the ultraviolet curing resin attached to the resin-protection substrate 15 can be easily removed.

The resin-protection substrate 15 is detached after the ultraviolet curing resin has been cured in the step S5.

Modified Examples 3

The above-described optical module manufacturing method is a method for manufacturing optical modules having an edge emitting semiconductor laser. However, the present invention may also be applied to a manufacturing method of optical modules having an edge receiving photodiode. It is also possible to apply the method according to the present invention to a method of manufacturing surface type optical devices such as vertical cavity surface emitting lasers (VCSELs) and surface type photodiode devices.

Figure 11:
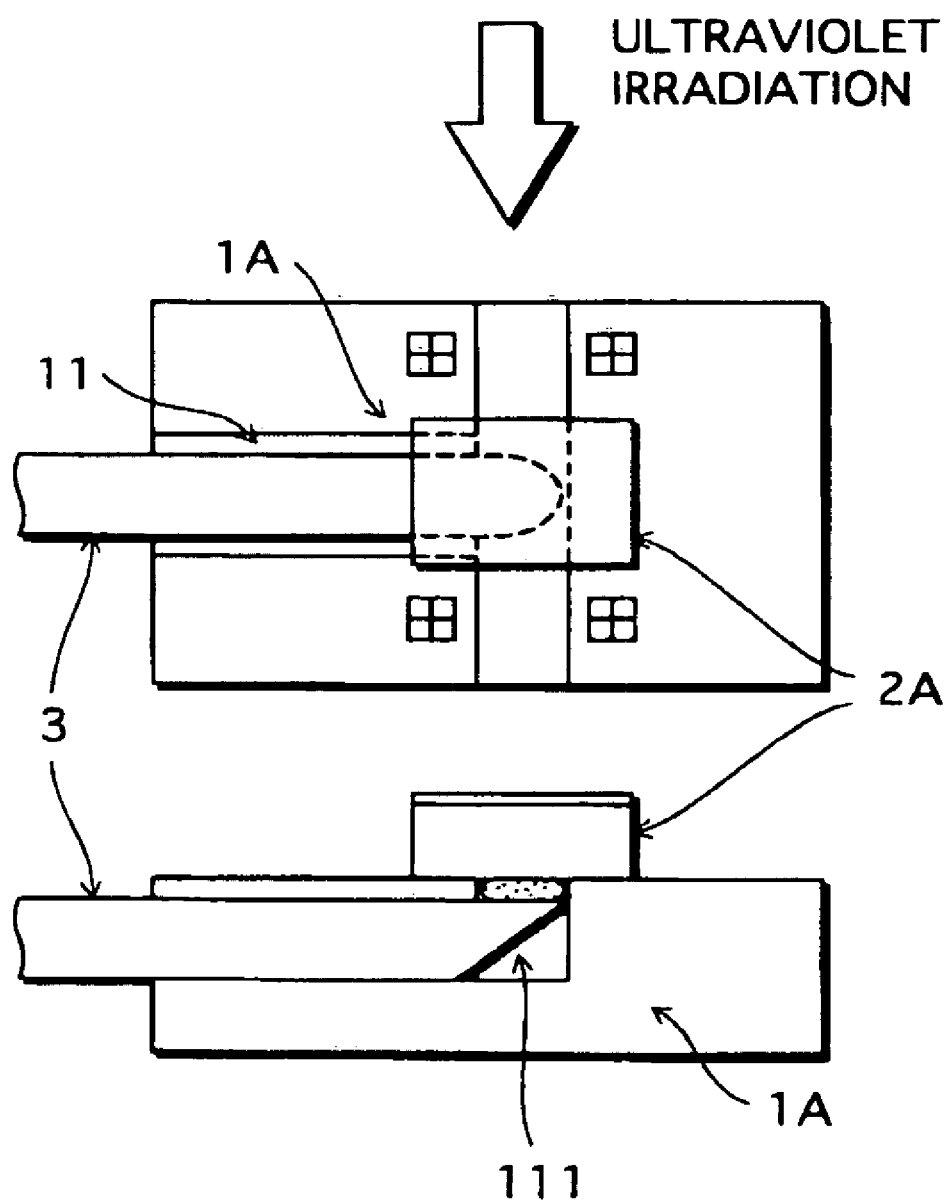
FIG. 11 illustrates an example in which the present invention is applied to a manufacturing process of surface type optical devices.
Figure 12:
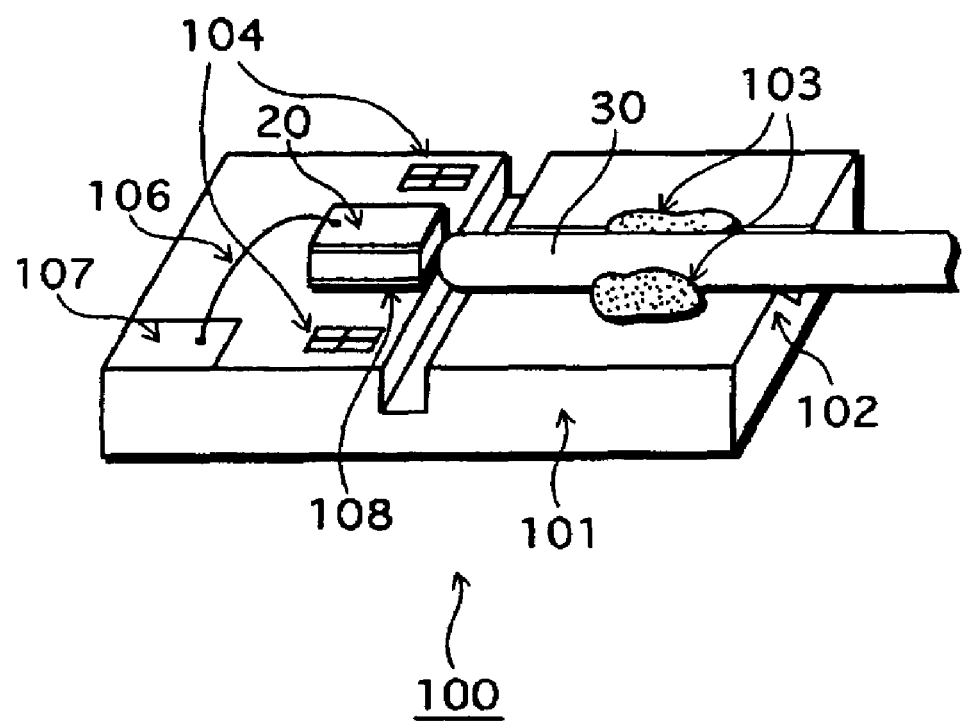
FIG. 12 is a perspective view illustrating an example of a passive alignment optical module.

FIG. 11 illustrates an example in which the present invention is applied to a manufacturing process of surface type optical devices.

As shown by the drawing, the optical fiber 3, one of whose ends is cut at approximately 45 degrees to the axis of the fiber, is placed in the V-shaped groove 11 on the optical alignment jig 1A, and a surface type optical device 2A is placed on the optical fiber 3.

Light that is transmitted through a core of the optical fiber 3 is outputted at right angle to the axis of the optical fiber 3 from an end surface 111 of the optical fiber 3 that has been cut at roughly 45 degrees.

Further, in case the surface type optical device 2A is a VCSEL, light emitted from the semiconductor laser incidents to the core of the optical fiber 3 reflecting at right angle to the axis of the fiber at the end surface 111 of the optical fiber 3.

The ultraviolet curing resin 4 has been applied to a side surface of the optical fiber 3 before the optical fiber 3 is placed in the V-shaped groove 11. After placing the optical fiber 3 in the V-shaped groove 11, the surface type optical device 2A is place data predetermined position on the optical-alignment jig. Then, by the ultraviolet irradiation from side, the ultraviolet curing resin 4 is cured and the surface type optical device 2A and the optical fiber 3 are bonded together.

Other Matters

The optical module manufacturing method and the optical module according to the present invention are not limited to the above-described methods and optical modules. The present invention also includes the followings.

(1) The optical module according to the present invention is not limited to the optical module manufactured using the method shown in the flowchart of FIG. 1. For example, the order of the steps S1 and S2 may be in reverse, and the semiconductor laser and optical fiber may be placed on the optical-alignment jig at the same time.

Further, the steps S3 and S4 may be one step using a resin having functions of index matching and ultraviolet curing.

As the resin having functions of index matching and an ultraviolet curing, WORLD ROCK No. 8962H produced by Kyoritsu Chemical & Co., Ltd. may be used, for example.

(2) Although the ultraviolet curing resin is used to bond together the semiconductor laser and optical fiber, it is possible to use a different kind of bonding material or adhesive.

(3) It is also possible to use a protecting material instead of the index matching resin, in order to prevent the ultraviolet curing resin from attaching the side surface of the optical device and the end surface of the optical fiber.

(4) The optical module according to the present invention is not restricted to an optical module manufactured using the apparatuses utilized in the above-described manufacturing steps.

Figure 9:
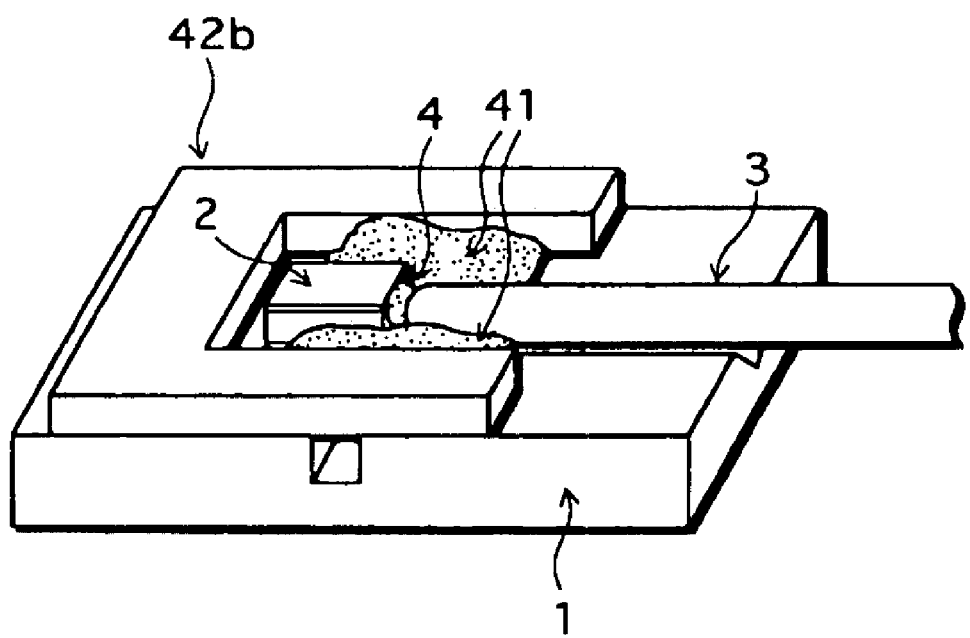
FIG. 9 illustrates a substep of reinforcing inserted between the steps S2 and S3 in FIG. 1.

(5) The reinforcement members shown in FIGS. 8 and 9 may be attached after the optical module 10 has been completed.

(6) According to the above-described optical module manufacturing method, the resin is filled between the end surface of the optical fiber 3 and the side surface of the semiconductor laser 2 that includes a light emitting point. However, it is also possible to bond the semiconductor laser 2 and optical fiber 3 using the reinforcement members in FIGS. 8 and 9 and the resin, without filling the resin between the light guides of the semiconductor laser 2 and optical fiber 3.

(7) The first main surface of the optical alignment jig 1 is fluoride-coated in order to prevent the bonding material, such as the resin for bonding the semiconductor laser 2 and optical fiber 3, from being attached to the optical alignment jig 1. However, it is also possible to obtain the same effect by applying a resin detaching material or a detaching sheet to the first main surface of the optical alignment jig 1.

(8) A semiconductor substrate used for manufacturing a conventional passive alignment optical module may be utilized as the above-described optical alignment jig 1. The optical alignment jig 1 may be made of any material including metal, resin, and wood, in addition to semiconductor.

(9) Although the optical alignment jig 1 shown in FIG. 2 and other drawings has the depression 13, the optical alignment jig does not have to include a depression.

(10) In the above optical module manufacturing method, the optical coupling between the semiconductor laser and optical fiber has been described. However, it is also possible to apply the present invention to a manufacturing method of optical modules that need an optically coupling between a light-receiving device such as photodiodes and a light guide.

(11) The modified example 2 describes the step of protecting the mounting surface by disposing the resin-protection substrate 15. The resin-protection substrate 15 and semiconductor laser 2 may be attached together using an adhesive that is easily detached. As an example of such an adhesive (resin), an electron wax that is solid at room temperature and melts when heated (around 60° C.), such as SHIFTWAX produced by Nikka Seiko Co., Ltd., may be used. Further, instead of disposing the resin-protection substrate 15, it is also possible to protect the mounting surface by applying a detachable resin to the surface of the semiconductor laser 2, and detaching the detachable resin after the ultraviolet curing resin is cured.

(12) The step S3 may be skipped, although the index matching resin is applied in the step S3. In other words, the present invention also includes a case in which the index matching resin is not applied.

(13) In the preferred embodiment, the ultraviolet curing resin is applied in the step S4 after placing the semiconductor laser 2 and optical fiber 3. However, the ultraviolet curing resin may be applied to one or both of the semiconductor laser 2 and optical fiber 3 prior to placing of the semiconductor laser 2 or the optical fiber 3.

(14) It is also possible to add a step of firmly bonding the optical fiber 3 during or after the step S7. For example, the V-shaped groove 11 in which the optical fiber 3 is to be placed may have a suction hole, so that the optical fiber 3 is temporarily held in place by suction via the suction hole.

(15) Although, the ultraviolet curing resin 4 is applied to the optical fiber 3 in advance in the modified example 3, the ultraviolet curing resin 4 may be applied, in advance, to a bottom surface of the surface type optical device 2A instead of the optical fiber 3. It is also possible to apply the ultraviolet curing resin 4 after the optical fiber 3 and surface type optical device 2A are placed on the optical alignment jig 1A.

(16) The modified example 3 described the case in which the ultraviolet light is irradiated from the side of the optical alignment jig 1A. However, it is possible to irradiate the ultraviolet light from behind through a hole that penetrates the optical alignment jig 1A. Further, the optical alignment jig 1A may be made of a material that transmits the ultraviolet light such as glass, so that the ultraviolet light is irradiated from behind through the optical alignment jig 1A.

(17) In the modified example 3, the end surface 111 of the optical fiber 3 is cut at roughly 45 degrees to the axis of the fiber. However, the end surface 111 may be cut at an angle between 1 degree and 89 degrees, inclusive.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical module manufacturing method, comprising:
    a first step of placing an optical device and an optical fiber at a predetermined position on an optical-alignment jig for optically coupling the optical device and optical fiber;
    a second step of bonding together the optical device and optical fiber placed on the jig using a bonding material, to form a bonded part; and
    a third step of removing the bonded part from the jig, and mounting the bonded part to an optical module substrate, wherein:
    the optical device is a semiconductor laser,
    in the first step, the semiconductor laser is placed junction-down on the jig, and
    in the third step, the semiconductor laser bonded to the optical fiber is mounted junction-up to the substrate.

2. An optical module manufacturing method according to claim 1, wherein the second step includes a substep of reinforcing a bonding strength between the optical device and optical fiber using a reinforcing member.

3. An optical module manufacturing method according to claim 1, wherein:
    the bonding material includes an index matching resin and an ultraviolet curing resin, and
    in the second step, the bonding material is filled between the optical device and optical fiber so as to cover an end surface of the optical fiber and a light emitting region, of the optical device and cured by ultraviolet irradiation.

4. An optical module manufacturing method according to claim 1, wherein:
    the jig has a suction hole, and
    in the first step, one of the optical device and optical fiber is temporarily held in place on the jig by suction via the suction hole.

5. An optical module manufacturing method, comprising:
    a first step of placing an optical device and an optical fiber at a predetermined position on an optical-alignment jig for optically coupling the optical device and optical fiber;
    a second step of bonding together the optical device and optical fiber placed on the jig using a bonding material, to form a bonded part; and
    a third step of removing the bonded part from the jig, and mounting the bonded part to an optical module substrate,
    wherein:
    the optical device includes one of a light emitting region and a light receiving region,
    the bonding material includes an index matching resin and an ultraviolet curing resin, and
    in the second step, the bonding material is filled between the optical device and optical fiber so as to cover an end surface of the optical fiber and the one of the light emitting region and light receiving region, and cured by ultraviolet irradiation, and
    wherein the second step includes a substep of protecting, using a protecting member, a mounting surface of the optical device to be mounted to the substrate.

6. An optical module manufacturing method according to claim 5, wherein
    the protecting member is made from a resin of a different material to the bonding material, and
    the second step further includes a substep of detaching the protecting member after the bonding material has been cured by the ultraviolet irradiation.

7. An optical module manufacturing method, comprising:
    a first step of placing an optical device and an optical fiber at a predetermined position on an optical-alignment jig for optically coupling the optical device and optical fiber;

a second step of bonding together the optical device and optical fiber placed on the jig using a bonding material, to form a bonded part; and a third step of removing the bonded part from the jig, and mounting the bonded part to an optical module substrate, wherein the jig is made of a material that transmits ultraviolet light.

8. An optical module comprising:

a bonded part including an optical device and an optical fiber that are optically coupled and bonded together using a bonding material; and an optical module substrate to which the bonded part is mounted, wherein:

the optical device is a semiconductor laser, the semiconductor laser is mounted junction-up to the substrate.

9. An optical module according to claim 8, wherein the substrate is made of a material one of ceramic and metal.

10. An optical module according to claim 8, wherein a bonding strength between the optical device and optical fiber is reinforced using a reinforcing member.

11. An optical module according to claim 10, wherein the reinforcing member is made of a material that absorbs heat from the optical device and releases the absorbed heat outside the module.

12. An optical module according to claim 8, wherein the bonding material includes an index matching resin and an ultraviolet curing resin, and the optical device and optical fiber are bonded together by the bonding material filled between the optical device and optical fiber so as to cover an end surface of the optical fiber and a light emitting region of the optical device.

13. An optical module manufacturing method, comprising:

a first step of placing an optical device and an optical fiber at a predetermined position on an optical-alignment jig for optically coupling the optical device and optical fiber;

a second step of bonding together the optical device and optical fiber stabilized on the jig by applying a bonding material to a side surface of the optical device and an end surface of the optical fiber, to form a bonded part and a third step of removing the bonded part from the jig, and mounting the bonded part on a surface of an optical module substrate, wherein the optical module substrate is a ceramic substrate or a metal substrate, the optical device is a semiconductor laser, and in the first step, the semiconductor laser is placed junction-down on the jig.

14. An optical module manufacturing method comprising:

a first step of placing an optical device and an optical fiber at a predetermined position on an optical-alignment jig for optically coupling the optical device and optical fiber;

a second step of bonding together the optical device and optical fiber stabilized on the jig by applying a bonding material to a side surface of the optical device and an end surface of the optical fiber, to form a bonded part;

a third step of removing the bonded part from the jig, and mounting the bonded part on a surface of an optical module substrate; and a fourth step of bonding the optical fiber to the optical module substrate by applying a resin to the optical fiber, wherein the optical module substrate is a ceramic substrate or a metal substrate.

* * * * *